United States Patent [19]

Fordyce

[11] Patent Number: 4,648,379
[45] Date of Patent: Mar. 10, 1987

[54] ROASTER FRAME OR RACK LIFTER

[76] Inventor: Donald E. Fordyce, 5337 Bastille, El Paso, Tex. 79924

[21] Appl. No.: 807,447

[22] Filed: Dec. 10, 1985

[51] Int. Cl.⁴ ............................................. F24C 15/16
[52] U.S. Cl. .................................. 126/337 R; 99/426; 248/153
[58] Field of Search ...................... 126/337 R; 99/426; 248/150, 153

[56] References Cited

U.S. PATENT DOCUMENTS

| 2,376,640 | 5/1945 | Wall et al. | 126/337 R |
| 2,593,077 | 4/1952 | Vogt | 126/337 R |
| 2,846,942 | 8/1958 | Bowman | 126/337 R |

Primary Examiner—Carroll B. Dority, Jr.

[57] ABSTRACT

A metal wire frame or rack designed to fit in a roasting pan to hold a fowl or roast. The wire is formed to provide handles to conveniently lift a large object from the roasting pan. An oval containing wire ring can be lifted from the frame for easy transferral of the fowl or roast to another surface.

5 Claims, 3 Drawing Figures

ROASTER FRAME OR RACK LIFTER

The primary purpose of this frame is to have a means to get a large fowl or roast out of a roasting pan.

The frame is placed in the roaster pan with the fowl or roast being placed inside the frame.

When the product has been cooked, the frame and product can be lifted by the handles from the pan, and placed outside the pan. The frame includes an oval containing ring which can be lifted off at this time, and the fowl or roast can be slid onto a cutting board or a platter.

A secondary object of this rack is to keep the fowl or other product off the bottom of the roasting pan. This keeps the product from burning on the bottom, and keeps the product out of the cooking fat. The frame has four legs which ensure this.

DETAILED DESCRIPTION

Figure 1:
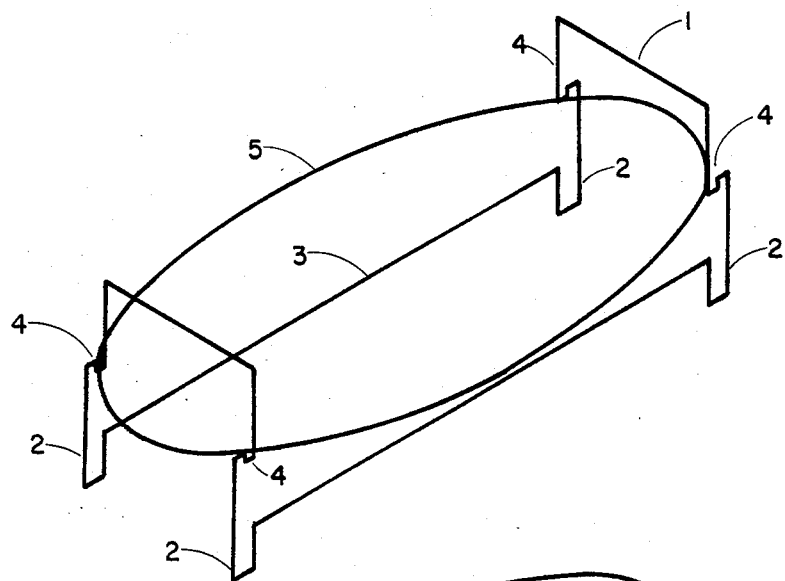
FIG. 1 is a vertical isometric projection of the wire frame.

Referring to FIG. 1, there is illustrated a wire rack frame consisting of two pieces. The rack includes a main support frame which supports an oval ring. The ring is adapted to receive a roast or fowl therein.

This frame or rack is designed to be placed in a roasting pan and to support a large fowl or a roast. The frame consists of two handles 1, four legs 2, the platform 3, and four slots 4 on which the oval containing wire 5 rests.

Figure 2:
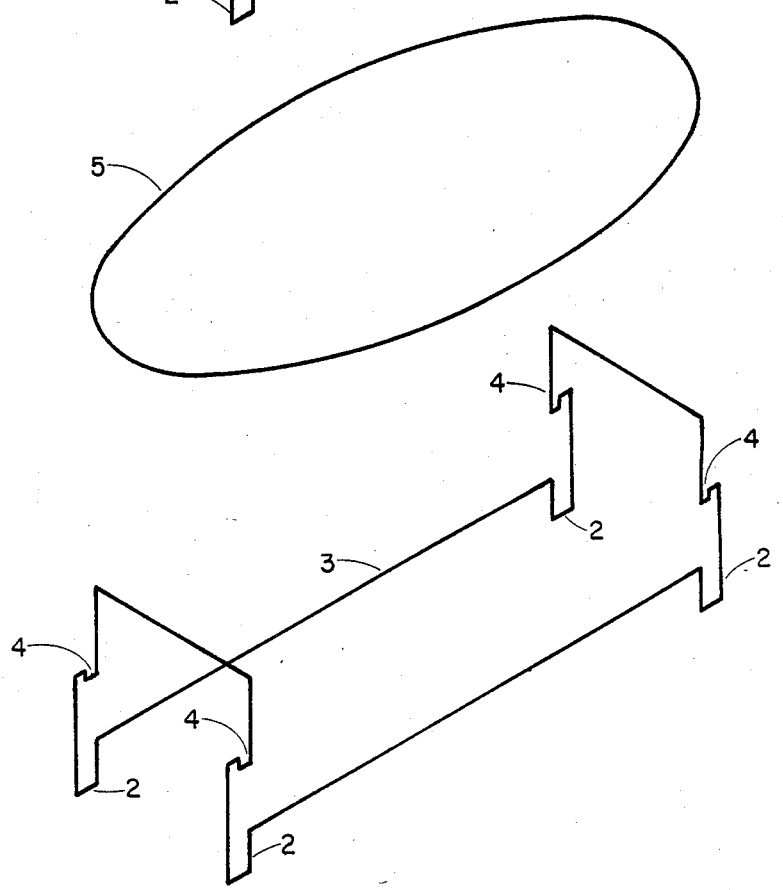
FIG. 2 is exploded to show the frame with the containing ring removed.
Figure 3:
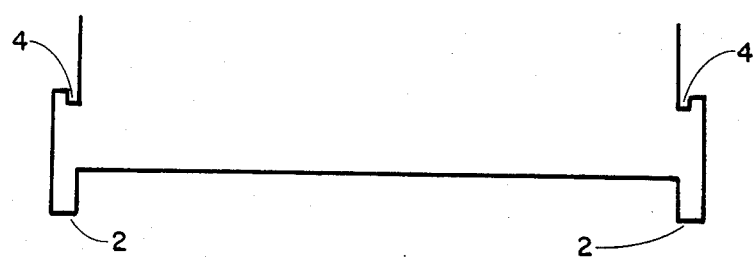
FIG. 3 is a side view to illustrate the slots which hold the wire containing ring.

As seen in FIG. 2, the oval containing wire 5 is separate from the frame and can be lifted off of the slots so that the product can be easily removed.

From the above description, it is believed that the construction and advantages of the invention will be readily apparent to anyone who has attempted to lift a large fowl or roast out of a roasting pan.

Various changes in detail may be made without departing from the spirit or losing the advantages of the invention.

The cooking rack of this invention comprises a main support frame, seen in the lower part of FIG. 2, and an oval containing member seen in the upper part of FIG. 2. The frame and containing member each are made from a length of wire bent into the illustrated configuration of FIG. 2.

As seen in FIG. 1, the containing member is supported within the slots 4 with the handles 1 being received through the opposed ends of the containing member, thereby maintaining the two members in proper assembled relationship.

Having thus described the invention, what is claimed as new and desired to be secured by patent is:

1. A cooking rack adapted to fit within a roasting pan and hold a fowl or roast;

said rack comprises a main support frame and a removable oval containing member made of bent wire; said main frame is in a form which provides handles at opposed ends thereof, legs at the bottom thereof, and slots above the legs and below the handles;

said removable oval containing member is supported within said slots with said handles being received within said oval containing member; whereby:

a product to be cooked is placed on said main support frame and within said removable oval containing member, said removable oval containing member is received within said slots on said main support frame, so that the rack containing the product can be placed within a roasting pan where the product is supported free of the bottom of the pan.

2. The cooking rack of claim 1 wherein said removable oval containing member is an endless wire; and, said main support frame is rectangular in form.

3. The cooking rack of claim 1 wherein said main frame is an endless wire and includes one said slot above each said leg.

4. The cooking rack of claim 3 wherein there are two said handles, four said legs, and four said slots.

5. The cooking rack of claim 1 wherein said oval containing member is an endless wire; and, said main support frame is rectangular in form;

wherein said main frame is an endless wire and includes one said slot above each said leg.

* * * * *